Dec. 16, 1958 S. SABAROFF 2,865,006

LONGITUDINAL ISOLATION DEVICE FOR HIGH FREQUENCY SIGNAL TRANSMISSION LINES

Filed Feb. 15, 1954 2 Sheets-Sheet 1

INVENTOR.

Samuel Sabaroff

Dec. 16, 1958 S. SABAROFF 2,865,006

LONGITUDINAL ISOLATION DEVICE FOR HIGH FREQUENCY SIGNAL TRANSMISSION LINES

Filed Feb. 15, 1954 2 Sheets-Sheet 2

INVENTOR.

Samuel Sabaroff 2,865,006

LONGITUDINAL ISOLATION DEVICE FOR HIGH FREQUENCY SIGNAL TRANSMISSION LINES

Samuel Sabaroff, Havertown, Pa.

Application February 15, 1954, Serial No. 410,185

9 Claims. (Cl. 333—33)

The present invention relates to high frequency signal transmission lines and more particularly to high frequency transmission lines for television signals and the like such as coaxial and multi-conductor lines serving to connect transmitters and receivers with antennas. Although its field of use is not limited thereto, the invention is presently adapted for meeting problems encountered in operating such lines in the presence of noise signals and other disturbances including the creation of reflections and ghost signals.

It is a primary object of the invention, to provide means for introducing impedance or inductive reactance in each side of a high frequency signal transmission line, which does not interfere with normal signal flow and which at the same time prevents the flow of longitudinal currents resulting from undesired reflections and noise signals.

It is also an object of this invention, to provide longitudinal isolation means for high frequency signal transmission lines such as coaxial and multi-conductor television signal transmission lines which may be inserted in the line or applied to the line at one or more points and which is of small size and relatively low cost.

It is a further object of this invention, to provide longitudinal isolation means for high frequency signal transmission lines which permits the free flow of desired signals while substantially preventing the flow of longitudinal currents between two portions of said line between which it is interposed.

In accordance with the invention, the multiple conductors of a high frequency signal transmission line providing one or more signal conveying circuits are closely surrounded by an elongated sleeve or tube of magnetic material having low magnetic losses and being substantially non-conducting so that the circuit conductors at the opposite ends of the sleeve or tube are separated by a high inductive reactance at the operating frequency range. Since such impedance appears in each conductor it does not interfere with signal flow, but does interfere with longitudinal currents which may tend to flow through the line from ground to ground and thereby introduce interference.

In a simple embodiment of the invention, a twin conductor of the flat-tape type may pass both conductors through a length of ferrite tubing which closely surrounds the twin lead for a short distance and serves to isolate points on both conductors at either end of the tubing thereby permitting the conductors at one end of the tubing to be operated in connection with a balanced transmission line or circuit while, for example, the conductors at the opposite end may be operated in connection with an unbalanced line.

Likewise by providing parallel pairs of conductors, each in its own ferrite sleeve, the terminal ends of the conductor pairs at either end of the sleeve may be connected in series or parallel, for impedance matching between two sections of a transmission line.

By introducing impedance or inductive reactance in each side of the usual signal transmission line of the twin conductor type, or in the outer shield conductor of a coaxial line, signals flowing therethrough are unimpeded for the reason that the external field is small for signals passing in opposite directions through the tube whereas longitudinal signal components that might tend to flow through the line are impeded by the inductive reactance introduced in the line. Thus there may be eliminated undesired noise signals, reflections and ghosts in signal transmission lines as provided between television receiving antennas, for example, and television receivers. In the case of coaxial condutcors, any signal carried by the outside conductor is, in effect, a longitudinal component and will therefore be impeded and prevented from appearing as a signal between the inner conductor and the outer conductor. In any case, it has been found that the longitudinal signal components, or signal current flow for undesired signals along the line, are substantially prevented by this means.

The novel features that will be considered to be characteristic of this invention are set forth with particularity in the appended claims. The invention itself, however, both as to its organization and method of operation, as well as additional objects and advantages thereof, will best be understood from the following description, when read in connection with the accompanying drawings, in which:

Figure 1:
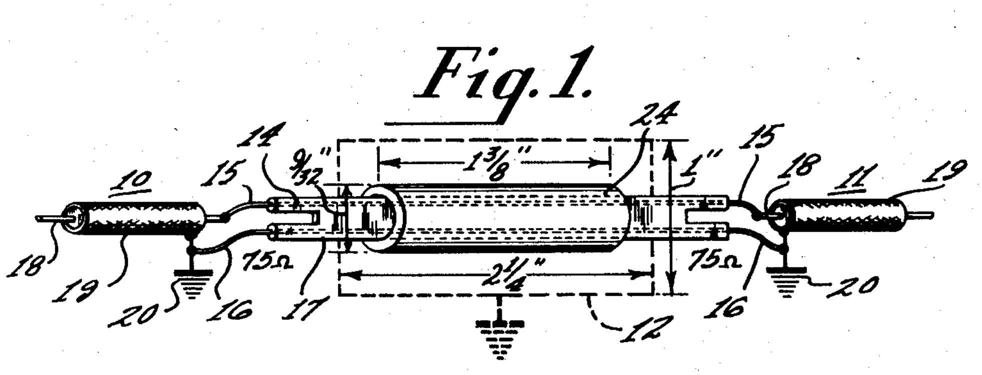
Figure 1 is a view in perspective of a longitudinal isolation device for a high frequency signal transmission line embodying the invention.

Referring to the drawings in which like elements throughout the various figures are designated by like reference characters, and referring now to Figure 1, between two sections 10 and 11 of a coaxial high frequency signal transmission line there is interposed a longitudinal isolation device 12, indicated by the dotted outline, comprising a relatively short 75 ohm twin conductor line section 14 having two signal conductors 15 and 16 carried in spaced relation by a flat tape or body of flexible insulating material 17. One conductor 15 at each end of the device is connected with the center or ungrounded conductor 18 of the transmission line, while the other conductor 16 is connected with the outer shield conductor 19 of the transmission line and may also be connected to ground as indicated at 20 at either end of the device 12.

Both conductors 15 and 16 of the twin conductors pass through a short sleeve or tube 24 of ferrite or other high frequency magnetic material having substantially the characteristics of a non-conductor. This sleeve or tube closely surrounds the twin conductor 17, and for V. H. F. television signals may be as shown, of the order of 1⅜" long by approximately 9/32" outside diameter. In this way the entire device may be relatively small and have dimensions as indicated, of 2¼" in length and approximately 1" square. In the form shown in Figure 1 the twin conductor 17 is passed through the tube or sleeve 24 and is then connected, as shown, to the ends of the two sections of the transmission line by soldering, or as otherwise desired.

Figure 1A:
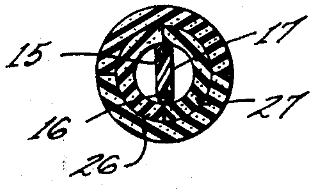
Figures 1A, 1B and 1C are cross-sectional views of certain modifications of an element of the device of Figure 1 in accordance with the invention.

However, the sleeve may be placed about the twin conductor in other ways. For example, it may be split longitudinally and may be either of circular cross section or rectangular as desired, such forms being shown in Figures 1A, 1B and 1C to which attention is directed. In Figure 1A the twin conductor 17 is surrounded by an inner-split sleeve 26 which in turn surrounds an outer split sleeve 27 to thoroughly enclose both conductors 15 and 16 with substantially a solid wall of high-frequency non-conducting magnetic material.

Figure 1B:
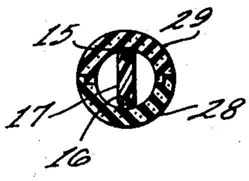
Figure 1C:
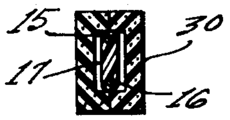

The joint in a single sleeve may be formed as shown in Figure 1B by staggering the joint as indicated at 28 on the sleeve 29. In Figure 1C the twin conductor 17 is enclosed within a split rectangular tube 20 and the joint may be tightly seated or staggered as desired. However, for commercial use, the single sleeve of unitary construction is preferred. It will be seen, however, that the form shown in Figures 1A, 1B, and 1C are adapted for placement about a twin conductor or coaxial line which is already in use, for introducing effective isolation against longitudinal signal flow, without cutting or otherwise disturbing its permanent connections.

Figure 2:
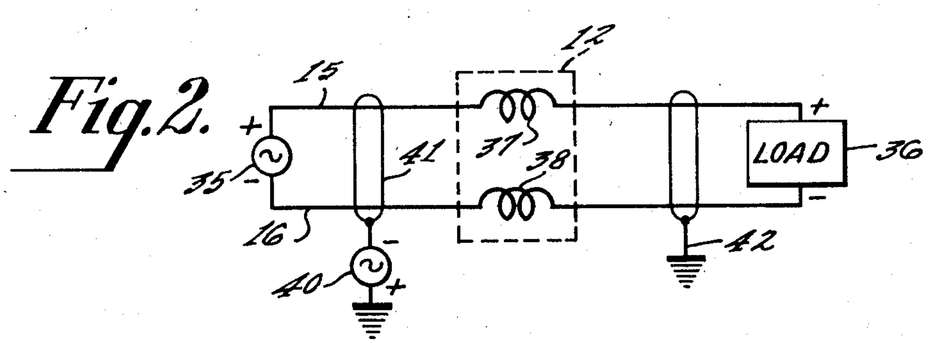
Figure 2 is a schematic circuit diagram illustrating the mode of operation of the device and transmission line shown in Figure 1 in accordance with the invention.

The manner in which the device of Figure 1 operates in a signal transmission line may be illustrated in the circuit diagram shown in Figure 2 to which attention is now directed. A transmission line comprising the conductors 15 and 16 as in Figure 1 is connected between a signal source or generator 35 and a load device 36. In the transmission line is introduced a longitudinal isolation device such as the device 12 of Figure 1, the effect of which is to introduce in each lead inductive reactance represented by inductors 37 and 38. If instantaneous signal currents having polarities as indicated at the generator end and at the load are flowing, the currents are balanced in opposite directions through the device 12 and no interference with the signal flow will be encountered. However, should a source of noise currents such as a second generator 40 introduce potentials into each conductor of the line as indicated by the loop 41 connected therewith, such currents are prevented from flowing along the line and out to ground through any medium such as a second ground path located at 42. Thus longitudinal current flows along the line are prevented.

The sleeve of high frequency magnetic material serves to introduce impedance into each side of the line, thereby isolating the two portions of the line on opposite sides of the device 12 at the operating frequency, and thereby preventing the flow of longitudinal currents through the line. It will be noted that the sleeve or tube surrounds both or all conductors of a line which may not be limited to two, and that there is no magnetic material between the conductors of the line. This is a feature of the invention, in that the conductors are surrounded but not separated by the body of magnetic material, which in all cases must be a sleeve jointly surrounding the conductors or each line. The material may be any low loss magnetic material for high frequency use such as a ferrite known commercially as Crowley CR–29. However, any high frequency non-conducting magnetic material having low losses may be used.

Figure 3:
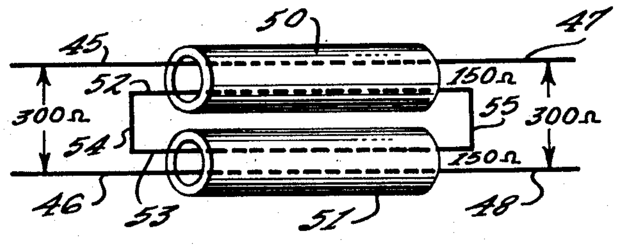
Figure 3 is a schematic circuit diagram of a modification of the form of the invention shown in Figure 1, illustrating its mode of operation.

To illustrate the principle of having the conductors of a transmission line, that is, both conductors of twin conductor lines for example, surrounded by sleeves or tubes of high frequency magnetic material, attention is directed to Figure 3 in which a 300 ohm transmission line comprising a conductor 45 and a second conductor 46 is connected with another section of the transmission line comprising two signal conductors 47 and 48. The conductor 45 passes through an elongated sleeve or tube 50 of ferrite or other suitable non-conducting high frequency magnetic material and is connected with the conductor 47, while the conductor 46 passes through a second sleeve 51 of ferrite or other suitable high frequency non-conducting material and is connected with the conductor 48.

Passing through the tube 50 in parallel spaced relation to and insulated from the conductor 45 is a second conductor 52. Likewise passing through the tube 51 in parallel spaced and insulated relation to the conductor 46 is a second conductor 53. Conductors 45 and 52 as one pair and conductors 46 and 53 as a second pair, make up two parallel 150 ohm lines. By connecting the conductors 52 and 53 together by end connections 54 and 55 the two 150 ohm sections of transmission line are connected effectively in series, thereby providing effective impedance matching between the conductors 45 and 46 on one side and the conductors 47 and 48 on the other side, whereby the main transmission line may have an effective impedance of 300 ohms on each side of the longitudinal isolation device constituted by the two tubular elements 50 and 51 and the transmission line sections surrounded thereby.

It will be seen that not only is the system now adapted for impedance matching but the isolation characteristic for the two parts of the transmission line is in no way impaired by this arrangement. The invention is therefore adapted for many uses in transmission lines, not only to isolate two sections between which it is introduced, but to effect an impedance matching. Furthermore, the transmission line section on one side of the device may be grounded or ungrounded, that is, balanced or unbalanced with respect to the other section which likewise may be balanced or unbalanced, as desired.

Figure 4:
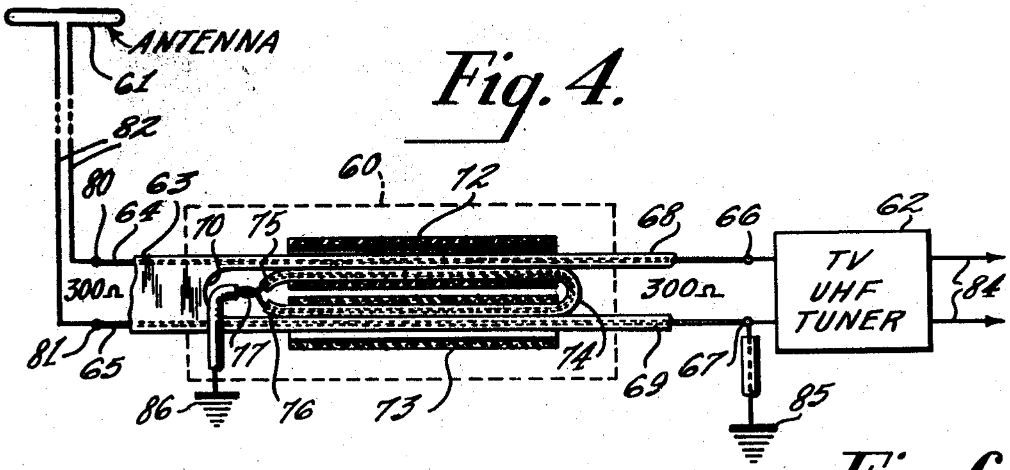
Figures 4 and 5 are cross-sectional views of longitudinal isolation devices for high frequency signal transmission lines constructed in accordance with the invention and utilizing the circuitry of Figure 3 to provide different impedance matching characteristics, Figure 5 being a cross-sectional view of a commercial embodiment of the invention.

Referring now to Figure 4 along with Figure 3, the device of Figure 3 and the principle of operation thereof may be utilized effectively as an isolation device indicated within the dotted lines 60, between a television receiving antenna 61 and a television ultra-high frequency tuner or receiver 62. The device 60 comprises a short section of twin conductor transmission line 63 having two spaced 300 ohm conductors 64 and 65 enclosed within the insulating tape of the line. The tape is cut back a considerable distance from the terminal ends 66 and 67 of the conductors, which form the output terminals of the device, to provide two insulated leads 68 and 69 extending back to the full depth of the cut as indicated at 70.

The above arrangement provides that the insulation of the twin conductor is removed at the center to a length sufficient to receive two elongated tubes or sleeves 72 and 73 of ferrite or other high-frequency non-conducting or other low loss magnetic material individually about each conductor for a short distance. An insulated conductor 74 is looped through the tubes or sleeves 72 and 73 to provide in each sleeve, with the conductors 68 and 69, parallel conductors 75 and 76 respectively. This provides two short transmission line sections, each comprising two conductors in each sleeve. By joining the ends of the insulated conductor 74 as indicated at 77 the two separate transmission line sections comprising insulated conductors 68 and 75 and insulated conductors 69 and 76 are connected effectively in series at each end.

The input terminals of the device 60 are indicated at 80 and 81 and to these are connected the conductors 82 of the 300 ohm transmission line leading to the antenna 61. The output terminals 66 and 67 are connected to the tuner or receiving device 62 from which signals are taken through output leads indicated at 84. The terminal 67 may be ground as indicated at 85 to provide the usual unbalanced input for the tuner while the terminals 80 and 81 remain balanced. It is preferable that a ground connection also be provided between the connection 77 for the added conductor, as indicated at 86.

With this arrangement, the antenna and transmission line may pick up undesired signals which are effectively blocked from passing through to the tuner and the ground connection 85 by the isolation device 60. This introduces a high impedance or inductive reactance into the two line sections and individually into each of the line conductors 64 and 65, so that the receiver or tuner 62 is unaffected by longitudinal currents. A 300 ohm transmission line coupler with an impedance of 300 ohms between the output terminals 66 and 67 and between the input terminals 80 and 81 is provided also. The internal transmission line sections are effectively 150 ohms each since they are in series in accordance with the circuit diagram of Figure 3.

Isolation devices of the type shown in Figure 1 and Figure 4, have been used effectively in signal transmission lines of the type shown without introducing signal loss while substantialy preventing response of the system to longitudinal currents, noise reflections and ghost signals. Thus it will be seen that since this device is highly effective and of low cost construction, it may have extensive uses commercially.

Figure 5:
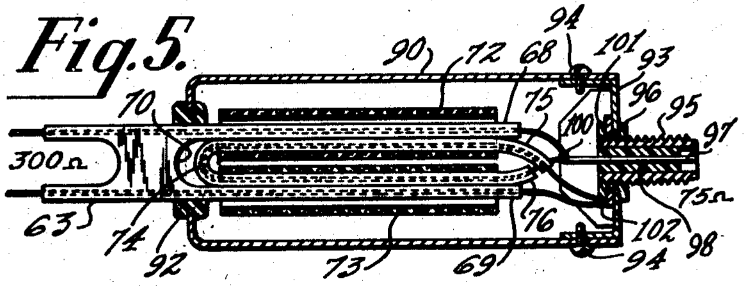
Figure 6:
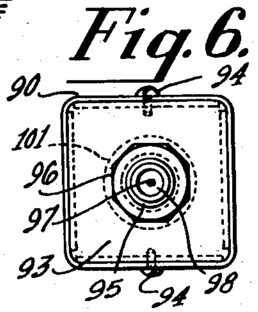
Figure 6 is an end view of the device shown in Figure 5.

As indicated by the dotted lines in Figure 4, the device may be enclosed within a shield container 90 as further shown in Figures 5 and 6 to which attention is now directed. The construction of the isolation device of Figure 5 is substantially the same as that of Figure 4 except that the 150 ohm lines in the individual tubes are connected in parallel rather than in series to provide a 75 ohm output connection for the 300 ohm input connection.

As in the preceding embodiment, the two ferrite or high frequency magnetic tubes or sleeves 72 and 73 extend longitudinally of the casing in parallel relation, and the 300 ohm twin conductor 63 is split as indicated at 70 with the leads 68 and 69 extending through the individual sleeves as in the preceding embodiment. The insulating conductor 74 is looped in the reverse direction through the two tubes and the conductors 75 and 76 are brought out at the same end with the leads 68 and 69. In this way each tube or sleeve surrounds a pair of conductors constituting a line section. The twin conductor 63 enters one end of the shield casing 90 through a rubber grommet 92 as shown and the opposite end of the casing is closed by a flanged plate 93 secured in place by suitable lock screws 94 extending through the casing walls and into the flange. In the center of the end plate 93 is located a shielded terminal connector comprising an outer sleeve 95 secured in place by a clamping nut 96 as shown in Figure 6. Centrally of the terminal connector is a high potential terminal comprising a rod 97 which passes through to the interior of the casing, being supported and locked in place within an insulating sleeve 98 tightly fitted into the connector.

To the inner end of the terminal 97 the leads 68 and 76 are connected as indicated at 100. The leads 69 and 76 are likewise connected together to a grounded terminal 101 as indicated at 102, so that the grounded sleeve 95 of the connector provides one of the output terminals along with the terminal 97. With this arrangement it will be seen that the line constituted by the leads 69 and 76 and the line constituted by the leads 68 and 75 are connected in parallel, so that the total output impedance is 75 ohms. This provides an impedance transformation from 300 ohms and at the same time provides for isolating the 300 ohm line 63 from the output terminals 95–97 for any outgoing connection that may be made therewith such as a coaxial cable of the type shown in Figure 1. The device shown in Figures 5 and 6 is substantially full size and it will be seen that accordingly, the device is compact and readily adapted for use in connection with various types of transmission lines. In each case the terminal connection means is that which meets the requirements of the line sections with which it is connected. From a consideration of the construction shown in Figures 4 and 5 it will be seen that along with isolation of the line sections to prevent longitudinal current flow, impedance transformation may be attained at the same time with the device in accordance with the invention.

Figure 7:
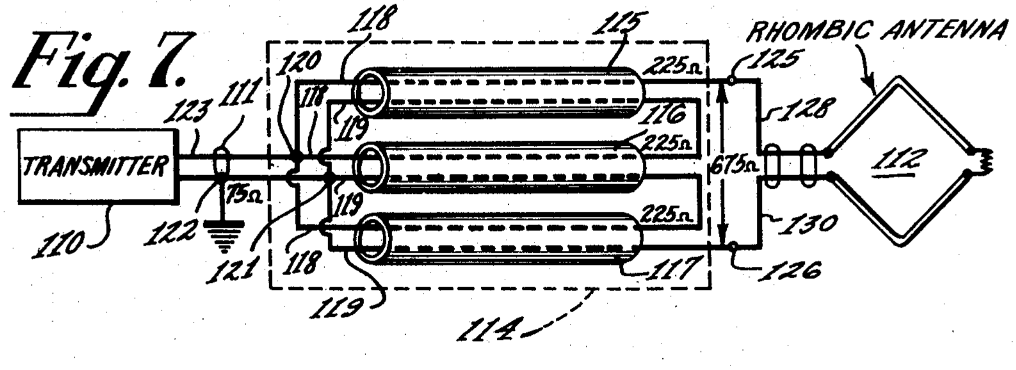
Figure 7 is a schematic circuit diagram of an antenna system for a transmitter provided with longitudinal isolation means for a high frequency signal transmission line between the antenna and the transmitter in accordance with the invention.

Referring now to Figure 7, a transmitter 110 having a coaxial cable 111 for an antenna line may be connected to a high impedance antenna such as a rhombic antenna 112 through a longitudinal isolation device 114 comprising three ferrite or other high frequency non-conducting magnetic tubes or sleeves 115, 116, and 117 arranged in parallel relation as shown and each containing two conductors 118 and 119 as a pair. Thus the sleeves 115, 116 and 117 surround pairs of conductors forming three parallel transmission line sections which may be connected in any suitable manner to provide both isolation and impedance transformation between the transmitter and the antenna.

In the present example, at the transmitter end of the device, the leads 118 of each pair are connected with one input terminal 120 while all of the leads 119 are connected in parallel to the other input terminal 121. The 75 ohm coaxial cable 111 has a grounded lead or shield 122 connected with the terminal 121 while the shielded or inner lead 123 is connected with the terminal 120. With this arrangement, the 75 ohm input impedance at the terminals 120 and 121 is stepped up in each of the pairs of conductors 118—119 to 225 ohms and at the output end indicated between terminals 125 and 126, the three lines are connected in series as shown, to give a total output impedance of 675 ohms for the rhombic antenna which is connected to the terminal 125—126 through a balanced transmission line comprising conductors 128 and 130. The transmitters thus may be provided with an unbalanced coaxial cable output connection whereas the antenna may have a balanced signal input connection, through the use of the device 114. Furthermore, an impedance transformation of from 75 to 675 ohms is readily attained by the use of the three-sleeve twin-conductor unit and the transmission line sections represented by the conductors 122—123 and 128–130 are completely isolated against longitudinal current flow therebetween.

This device is shown by way of example as representing one embodiment of the invention for effecting such longitudinal isolation, impedance transformation and balun effect with one unit.

The invention is adapted for many uses, and isolation devices of this type may be constructed of readily available materials comprising twin conductors, twisted pairs or coaxial cable elements, wherein the conductors are spaced or insulated as a line section and adapted jointly to be surrounded by a single sleeve or tube of ferrite or other similar high-frequency nonconducting magnetic material, with no magnetic material between the conductors. A device constructed in accordance with the invention furthermore, may be made compact in size and provided with any suitable terminal means adapted for connection with various types of high frequency apparatus and transmission line means.

What is claimed is:

1. A longitudinal isolation device for high frequency signal transmission lines, comprising in combination, a plurality of substantially parallel-extending rectilinear conductor elements providing a twin conductor transmission line section of relatively short length compared to a transmitted wave length, an open-ended tubular sleeve of high-frequency non-conducting magnetic material closely surrounding all of said conductor elements within its hollow interior collectively over a major portion of the length thereof, and means providing signal input and output connections for said conductor elements at opposite ends of said sleeve, thereby to interpose impedance to longitudinal current flow through said section between said connection means.

2. A longitudinal isolation device as defined in claim 1, wherein the conductor elements are arranged and connected in pairs with said signal input and output connection means to provide a predetermined input-to-output impedance ratio for said device.

3. A longitudinal isolation device for high frequency signal transmission lines, comprising in combination, two rectilinearly extending conductors providing a twin conductor transmission line and adapted to form part of a transmission line connection and arranged in substantially parallel relation to each other for a predetermined relatively short length compared to a transmitted wave length, an open-ended tubular sleeve of high-frequency non-conducting magnetic material closely surrounding both said conductors within its hollow interior collectively over a major portion of said conductor length, and means providing transmission line connections for said conductors at opposite ends of said sleeve.

4. A longitudinal isolation device for high frequency signal transmission lines comprising a combination, a twin-conductor transmission line section, an elongated open-ended tubular sleeve of high-frequency non-conducting magnetic material surrounding each of the conductors of said line section individually, second conductor means within each of said sleeves extending in substantially parallel relation with and insulated from each of said first named conductors in each of said sleeves to provide transmission line sections of relatively short length compared to a transmitted wave length, means providing terminal connections for said device, and said conductors being connected at opposite ends of said sleeves to provide a desired impedance ratio through said device between said terminal connection means.

5. An impedance device for high-frequency signal transmission lines comprising in combination, a plurality of elongated tubes of low-loss non-conducting magnetic-material, means providing twin conductor transmission line sections extending through each of said tubes respectively, said transmission line sections being of relatively short length compared to a transmitted wave length, means providing pairs of transmission line terminals at opposite ends of said tubes, and means connecting said pairs of conductors and terminals at opposite ends of said tubes in predetermined relation to provide longitudinal isolation and predetermined impedance ratios between said pairs of terminals at opposite electrical ends of said device.

6. A longitudinal isolation device for high frequency signal transmission lines, comprising in combination, a plurality of substantially parallel-extending conductor elements in pairs providing transmission line sections of relatively short length, a plurality of open-ended tubular sleeves of high-freqency non-conducting magnetic material each of said sleeves closely surrounding a pair of said conductor elements within its hollow interior, signal input and output terminal means for said device, and connection means for said conductor elements in pairs at opposite ends of said sleeves providing a series of twin conductor transmission line sections each of a relatively short length compared to a transmitted wave length between said input and output terminal means having relatively low impedance to signal current flow therethrough and relatively high impedance to longitudinal current flow therethrough resulting from undesired reflections and noise signals.

7. A longitudinal isolation device for high frequency signal transmission lines comprising in combination, a multiple-conductor transmission line section, an elongated open-ended tubular sleeve of high-frequency non-conducting magnetic material surrounding each of the conductors of said line section individually, second conductor means within each of said sleeves extending in substantially parallel relation with and insulated from each of said first named conductors in each of said sleeves, means providing terminal connections for said device, and said conductors being connected at opposite ends of said sleeves to provide a desired impedance ratio through said device between said terminal connection means, said first named conductors of the transmission line section being connected to said terminal connection means at opposite ends of the sleeves and said second named conductors being connected together at opposite ends of the sleeves.

8. A longitudinal isolation device for high frequency signal transmission lines comprising in combination, a multiple-conductor transmission line section, an elongated open-ended tubular sleeve of high-frequency non-conducting magnetic material surrounding each of the conductors of said line section individually, second conductor means within each of said sleeves extending in substantially parallel relation with and insulated from each of said first named conductors in each of said sleeves, means providing terminal connections for said device, and said conductors being connected at opposite ends of said sleeves to provide a desired impedance ratio through said device between said terminal connection means, said first named conductors of the transmission line section being connected directly with the terminal connection means at opposite ends of the sleeves and said second named conductors being connected together at one end of the sleeves and with said terminal means at the other end of said sleeves to effectively provide operation of the conductors in each sleeve as transmission line sections in series at one end and in parallel at the other for impedance transformation.

9. An impedance device for high-frequency signal transmission lines comprising in combination, a plurality of elongated tubes of low-loss non-conducting magnetic-material, means providing pairs of insulated conductors extending through each of said tubes, means providing pairs of transmission line terminals at opposite ends of said tubes, and means connecting said pairs of conductors and terminals at opposite ends of said tubes in predetermined relation to provide longitudinal isolation and predetermined impedance ratios between said pairs of terminals at opposite electrical ends of said device, said pairs of conductors for each tube being connected in parallel relation with the other conductors to one pair of said terminals and in series relation with the other conductors to another pair of said terminals.

References Cited in the file of this patent

UNITED STATES PATENTS

| | | |
|---|---|---|
| 2,286,428 | Mehler | June 16, 1942 |
| 2,439,277 | Walker | Apr. 6, 1948 |
| 2,457,806 | Crippa | Jan. 4, 1949 |
| 2,509,057 | Guanella | May 23, 1950 |